United States Patent [19]
McFadin

[11] Patent Number: 5,418,732
[45] Date of Patent: May 23, 1995

[54] LASER TARGETING SYSTEM

[75] Inventor: Phillip G. McFadin, Riverside, Calif.

[73] Assignee: Odetics, Inc., Anaheim, Calif.

[21] Appl. No.: 982,083

[22] Filed: Nov. 25, 1992

[51] Int. Cl.⁶ .............................................. G06F 15/20
[52] U.S. Cl. ..................... 364/478; 414/273; 414/786
[58] Field of Search ............... 414/273, 331, 932, 277, 414/280, 281, 786; 360/92; 364/478

[56] References Cited

U.S. PATENT DOCUMENTS

| | | | |
|---|---|---|---|
| 4,734,005 | 3/1988 | Blumberg | 414/273 |
| 4,903,815 | 2/1990 | Hirschfeld | 414/273 X |
| 5,113,349 | 5/1992 | Nakamura | 414/273 X |
| 5,303,034 | 4/1994 | Carmichael | 414/273 |

Primary Examiner—Cheryl L. Gastineau
Attorney, Agent, or Firm—Graham & James

[57] ABSTRACT

A method and apparatus for targeting a robotics materials handling and sequencing system having a plurality of storage bins. A targeting cassette is inserted into one or more of the stationary storage bins and a laser scanner is utilized to read an identification code on the targeting cassette. Based upon the reading of the laser scanner, the position of the targeting cassette is calculated. Additional storage locations can be calculated either by targeting the location or using an interpolation method to calculate the location of the remaining storage bins.

21 Claims, 8 Drawing Sheets

LASER TARGETING SYSTEM

BACKGROUND OF THE INVENTION

1. Field of the Invention

The present invention relates to a robotics handling system for storing and handling articles. More particularly, the present invention relates to a laser targeting system for use with a robotics system for handling videocassettes in an automated programmable sequence.

2. Description of the Prior Art

Existing prior art videocassette storage, handling and sequencing systems typically embody one of two forms. In certain systems, videotape cassettes are stored on a movable carousel and the desired cassette is positioned for removal by rotation of the carousel. The cassette is then loaded into the tape transport by a robotics handling mechanism. Other robotics sequencing systems incorporate one or more stationary columns of storage bins in which cassettes are held and an elevator robotics system loads the designated cassettes into specific transport units. In these latter systems, it is known to place a bar code label on the videocassette and use a bar code reader to allow a computer control system to determine the location of the cassette to be retrieved and control the movement of the cassette from a storage bin to a tape transport. Exemplary of such systems are U.S. Pat. No. 4,654,727 (which discloses an automatic cassette handling and sequencing system utilizing a bar code reader and is capable of storing hundreds of cassettes for handling) and U.S. Pat. No. 4,846,619 (which discloses a robotics handling system having a plurality of columns of storage bins located about a circle), While recently developed systems such as the ones embodied in the above-identified U.S. patents have expedited the handling and sequencing of cassettes in robotics systems, the adjustment of cassette loading and handling pickup points has often been a difficult and time consuming effort. Fine tuning and adjusting of pickup points (or "targeting") is necessary to ensure that the robotics can properly grasp a cassette and insert it into a transport. Targeting is generally necessary at the time of installation of a robotics system in order to adjust the handling robotics to compensate for inconsistencies in manufacturing (or for manufacturing tolerances) and for the effects of stress being applied to various parts during installation. After installation and the initial targeting, the system may become slightly misaligned during use. For example, misalignment may occur when a video transport in the system is serviced or the entire system moved, or due to normal wear and tear such as belt stretch and fatigue. The effect of such misalignment serves to handicap the sequencing and handling capabilities of the system. In existing systems, however, both initial targeting and subsequent retargeting require significant time and effort and manual adjustment of the entire system.

SUMMARY OF THE INVENTION

The present invention is directed to a laser targeting system for an automatic cassette handling and sequencing system. The laser targeting system expedites and facilitates the initial targeting, and any subsequent requisite re-targeting, of the handling and sequencing system.

In the present invention, a laser targeting system is provided for use with a robotics materials handling system for handling cassettes which are stored in a library. The library includes at least one vertical column having a plurality of stationary storage bins, each storage bin capable of storing one cassette. The laser targeting system includes a targeting cassette that is insertable into each of the bins. A manipulator assembly is provided for handling the targeting cassette and selectively moving the targeting cassette between the storage bins. The targeting cassette includes an identification code, and a laser scanner is provided for reading the identification code. A control system calculates the relative x- and y-axes position of the targeting cassette based upon the reading by the laser scanner. In this fashion, the precise bin position may be determined.

BRIEF DESCRIPTION OF THE DRAWINGS

The invention will be described with reference to the accompanying drawings, wherein.

DESCRIPTION OF THE PREFERRED EMBODIMENT

The following description is of the best presently contemplated mode of carrying out the invention. This description is made for the purpose of illustrating the general principles of the invention, and is not to be taken in a limiting sense. Exemplary is the fact that, although the invention is described with reference to a videocassette handling system, the invention may be utilized in other applications where similarly sized articles are to be stored and handled. The scope of the invention is best determined by reference to the appended claims.

Figure 1:
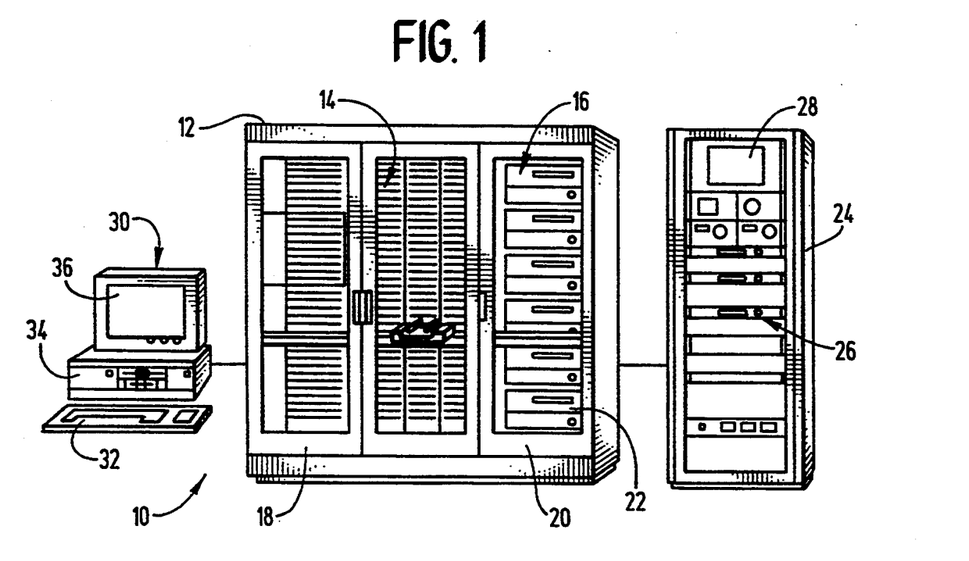
FIG. 1 is a perspective view of a cartridge handling and sequence system incorporating the laser targeting system of the present invention.

Referring to FIG. 1, a videocassette sequencing system is shown generally by reference numeral 10. A library cabinet 12 includes a library bin portion 14 and a videocassette transport and electronics section 16. The library bin portion 14 is configured to store in the range of 90 to 150 cassettes, depending upon the cassette size, and has a hinged cabinet door 18 so as to allow access to the cassettes. The electronics section 16 also includes a door 20 and a plurality of video cassette transports 22 and associated electronics. A monitoring cabinet 24 includes various electronics for audio monitoring (generally indicated as 26) and video monitors 28. The programming operation of sequencing system 10 is controlled by a main controller computer 30 which controls the targeting operation of the instant invention. As shown in the preferred embodiment of FIG. 1, main controller computer 30 is a personal computer including a control keyboard 32, computer hardware 34 and a video display monitor 36.

Figure 2:
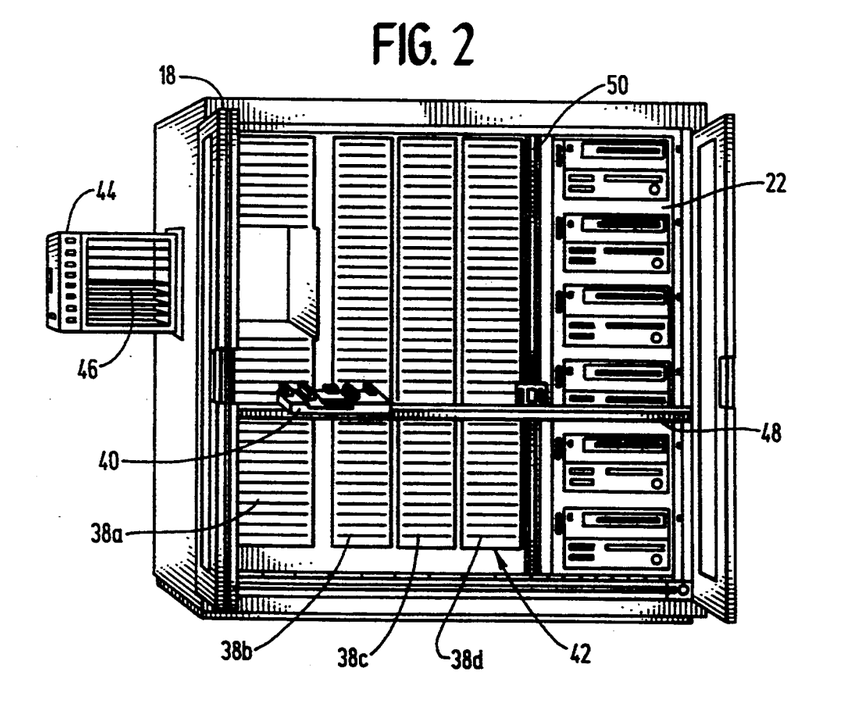
FIG. 2 is a partial plan view of a cartridge handling and sequence system incorporating the laser targeting system the present invention.

Library bin portion 14 includes four columns 38a–d of cassette storage bins, as best shown in FIG. 2. Multiple cassette sizes are capable of being handled and, while only two cassette sizes are shown; e.g., compare column 38a with columns 38b–d, it should be appreciated that the present sequencing system may be configured to handle a combination of varying sizes and quantities of cassettes to meet the requirements of individual system applications. Thus, the total number of storage bins will vary with the size and number of cassettes in a particular application. In the present embodiment, column 38a includes 30 individual storage bins, and each of columns 38b, 38c, and 38d includes 40 bins, thus containing a total of 150 storage bins. The columns 38a–d are arranged in a linear fashion, with the front surface of each column being coplanar with the others.

Positioned within the library cabinet 12 is a manipulator assembly 40 which is movable within an x- and y-axes plane in central space 42 of the library cabinet 12, and is used to transport cassettes between storage bins and tape transports where the selected cassettes are played consecutively in the desired order. While cassettes may be manually loaded into the library bin portion 14, manipulator assembly 40 may also be used to automatically load cassettes into storage bins through use of load port 44 having load port bins 46. When cassettes are automatically loaded, the manipulator assembly 40 is directed by the main controller computer 30 to pick-up cassette(s) from the load port bins 46 and place each one into a designated storage bin or tape transport. Movement along the x- and y-axes is accomplished by manipulator assembly 40 which is mounted on robotics assembly shaft 48 by means of a mounting bracket 52 (best shown in FIG. 3).

Figure 3:
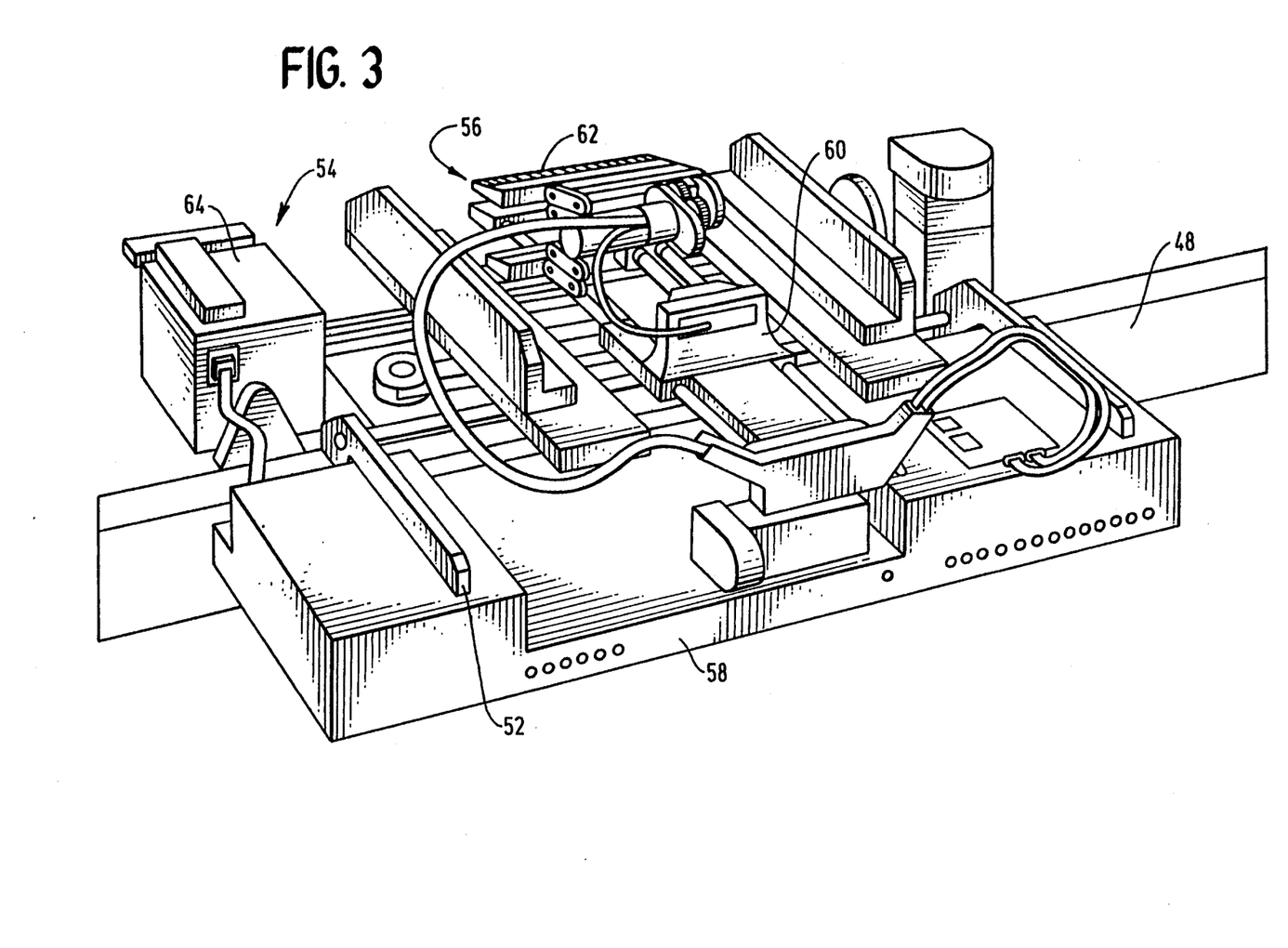
FIG. 3 is a partial perspective view of the manipulator mechanism assembly of the present invention.

The manipulator assembly 40 is driven along the shaft 48 by means of a belt drive mechanism (not shown). Similarly, the shaft 48 is coupled to a vertical shaft 50 for movement in the vertical direction. The shaft 48 is supported by bearings at each end of cabinet 12 and a belt drive mechanism (not shown) in the shaft 50 drives the shaft 48, and with it manipulator assembly 40. The manipulator assembly 40 may thus be positioned in front of any storage bin or tape transport.

Manipulator assembly 40 is controlled by the main controller computer 30 which is programmed to include data regarding every cassette in general use in the system, e.g., all of the cassettes of general use in a television station. When manipulator assembly 40 is moved into position to retrieve a cassette from a cassette storage bin and move it to a transport, an identification code located on an individual label attached to each cassette is read. Upon confirmation through the main controller computer 30 that the correct cassette has been retrieved, the cassette is then moved from the storage bin to the transport for playing. The reading of the identification code, and the grasping of the cassette are accomplished by a reader assembly 54 and a cassette gripper mechanism 56, respectively, both of which are removably attached to a cassette handler hub assembly 58 of manipulator assembly 40. Cassette gripper mechanism 56 is mounted on a slider 60 on hub assembly 58 which enables the cassette gripper 62 to be slidably moved along a third plane axis (z-axis) within central space 42. Specifically, gripper 62 slides forward to grasp a cassette during cassette retrieval and retracts backward to remove the cassette from a storage bin or transport. As will be discussed in greater detail, reader assembly 54 includes a laser scanner 64 which is capable of reading identification codes for the dual function of cassette identification and the determination of precise bin location, i.e., targeting.

In order for the sequencing system to efficiently and accurately locate and move a particular cassette from a respective storage bin to a transport and back, the precise position of the cassette as it rests in a storage bin must be determined ("targeted"). The determination of the precise location of a cassette is accomplished by the targeting operation which will now be discussed in detail.

In the present invention, a targeting cassette 66 (best shown in FIG. 4) is utilized for the targeting operation. Targeting cassette 66 is placed within a cassette storage bin and manipulator assembly 40 is moved into a default position by the main controller computer 30 to enable the laser scanner 64 to read a bar code label 68 that is precisely positioned on targeting cassette 66. With respect to the default position, because access to cassettes and transports in the instant robotics sequencing system is achieved by bin type, i.e., storage bin, load port bin or transport, and by the bin number of the particular bin type, an initial default value exists for each storage bin, load port bin and transport. This default value is based on x- and y-axes coordinates and is more specifically and exactly defined during the targeting operation.

Prior to the targeting operation the precise position of the reader assembly 54 on manipulator assembly 40 must be calibrated and accounted for in order to ensure that each scan provides consistent and accurate results. This may be accomplished through two steps. First, it should be appreciated that laser scanner 64 is not positioned on the middle of the manipulator assembly 40, and thus in order for the laser scanner 64 to read bar code label 68 (which is similarly offset from the center of targeting cassette 66) it must be moved into a position that is offset from the center of the initial default target location of the storage bin being targeted. A bar code offset is preset into the system and is the relative x,y axis positioning (with respect to the stored target position) necessary in order to place the manipulator assembly 40 in a position such that the laser scanner 64 is in position to read the bar code label 68 of targeting cassette 66. The bar code offset is based upon a nominal offset which is a non-editable, constant value. When the targeting is being performed, it should be appreciated that manipulator assembly 40 is moved to the initial default x- and y-axes target position plus the bar code offset x- and y-axes value. At this combined x- and y-axes location, laser scanner 64 is in position to read bar code label 68 and initiate the target scan.

Figure 5:
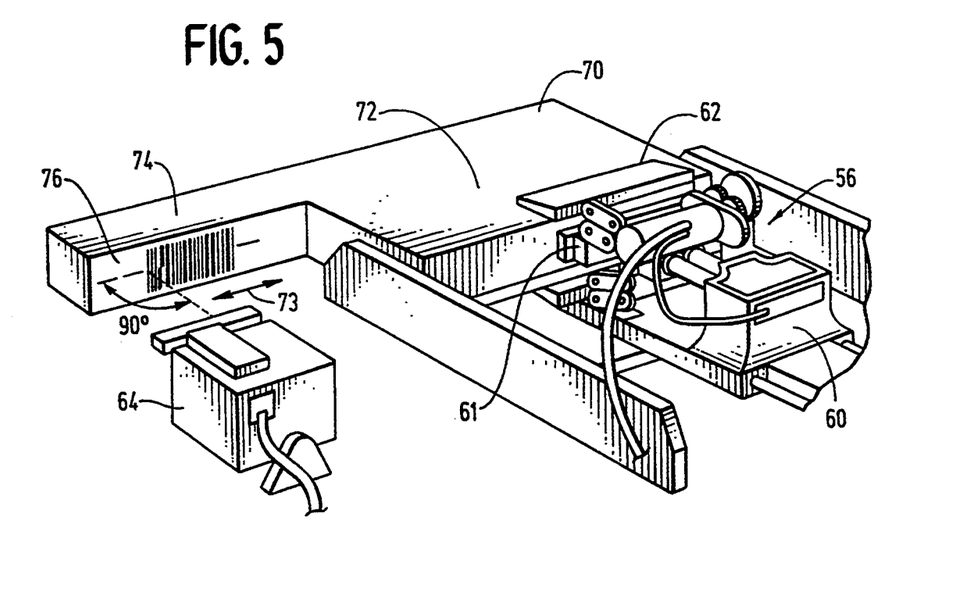
FIG. 5 is a perspective view of the cassette calibration tool of the present invention.
Figure 6A:
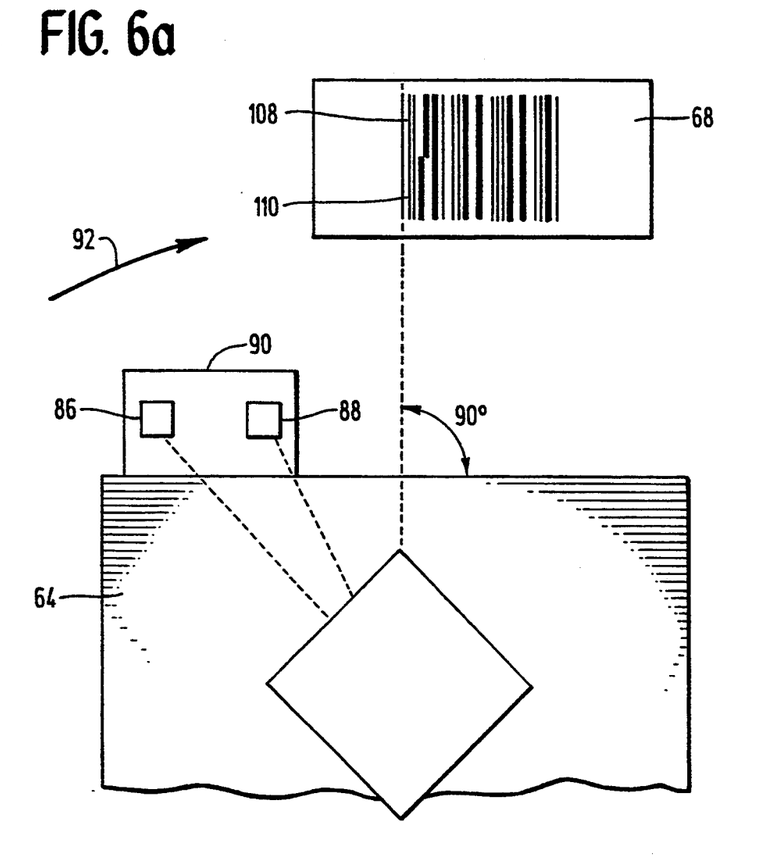
FIGS. 6a and 6b are diagrammatic views of the horizontal targeting process of the present invention.

Second, the laser scanner 64 must be positioned in order to ensure the accuracy of each scan. As will be discussed in more detail part of the targeting process involves determining a length of time a single scan takes to reach the start of the bar code on bar code label 68 from a predetermined starting point. In order to accurately determine the position of the targeting cassette 66, the start of the bar code on bar code label 68 should be positioned at a point 90 degrees relative to the scanner, i.e., the scan beam should strike the start of the bar code at a ninety degree angle (as shown in FIGS. 5 and 6a). The 90 degree positioning ensures that variances in the depth of bins, for example between cassette sizes, or in cassette placement depth, do not impact the targeting operation. A targeting calibration tool 70, best shown in FIG. 5, is used to ensure the desired scanning angle and orientation. Targeting calibration tool 70 includes a body portion 72 which is placed within gripper 60 and an elongated label portion 74 having a calibration bar code label 76. Calibration bar code label 76 is spatially positioned from the body portion 72 of targeting calibration tool 70 the same distance as bar code label 68 is from the center of targeting cassette 66. The tool 70 (and the targeting cassette 66) will be automatically centered by the gripper assembly, and the bar code on the tool 70 will therefore be positioned a precise distance from the center of the gripper 70. When targeting calibration tool 70 is in place, the precise position of laser scanner 64 is manually set alignment to achieve the 90 degree reading position. This is accomplished by means of a micrommometer position adjustment (not shown) which allows precise adjustment of the position of the scanner with respect to the gripper 60 in a direction of arrow 73. Pitch and roll adjustments may also be made to control the beam sweep. The fixed spatial relationship between laser scanner 64 and gripper 62 is now set thereby permitting accurate targeting of a storage bin by use of the targeting cassette 66.

Figure 4:
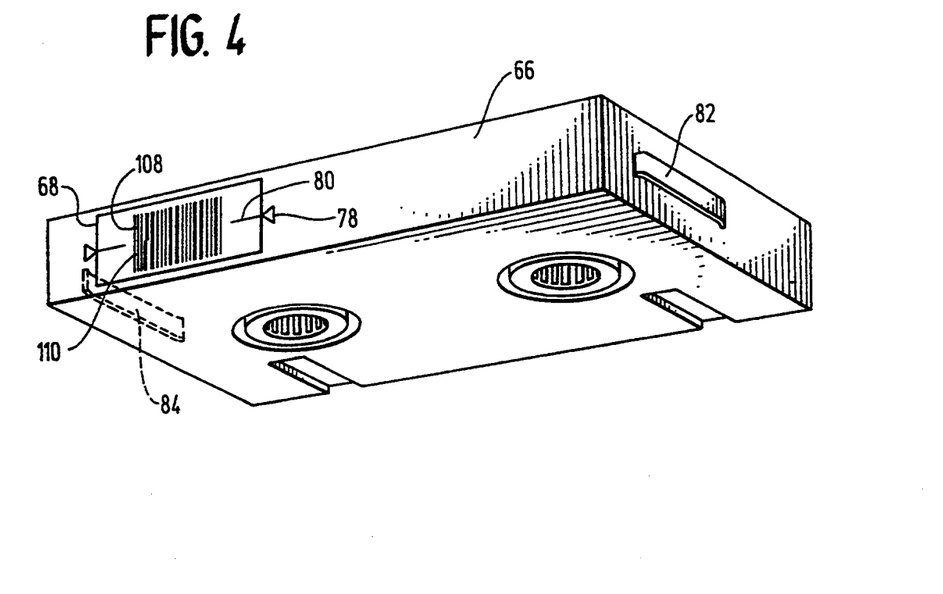
FIG. 4 is a perspective view of the targeting cassette of the present invention.

Bar code label 68 must, of course, be accurately positioned on targeting cassette 66. To aid in the positioning, the front of the targeting cassette 66 includes precisely located code centering marks 78, which are aligned with a similarly positioned mark or cross-hairs 80 on bar code label 68 when the bar code label 68 is properly affixed to targeting cassette 66.

The scanning operation performed by laser scanner 64 during the targeting operation in order to determine the precise location of the targeting cassette 66 within a storage bin will now be discussed. To accurately target the location of a storage bin, both the relative horizontal and vertical (x- and y-axes) location of the bin must be precisely determined.

Horizontal targeting is accomplished through a two-fold procedure. First, side-mounted springs 82 and 84 of targeting cassette 66 ensure that targeting cassette 66 is physically centered within the storage bin itself. While the preferred embodiment depicts the use of side-mounted springs 82 and 84, it is contemplated that various centering methods may be utilized, e.g., foam positioning tabs, flexible strips or the like. As shown in the preferred embodiment, bar code label 68 is positioned on the left of the center of targeting cassette 66. This positioning occurs in order to accommodate the position of the laser bar code scanner 62 which is also offset by the same distance from the actual center point of the gripper 60.

The second aspect of horizontal targeting ensures that the exact center of the targeting cassette 66, and thus the center of the storage bin within which targeting cassette 66, is located.. The bar code located on bar code label 68 is read by the laser scanner 64 as it sweeps a beam from left to right across bar code label 68. It should be understood that while the beam sweep speed may not be an absolute constant from one scan to the next, for any given sweep the overall speed of the beam is a substantially constant velocity. Accordingly, the present invention compensates for the beam speed variances. As shown in FIG. 6a, photosensors 86 and 88 are located on a sensor bracket 90 on reader assembly 54 (FIG. 3) and are fixed in space and distance from laser scanner 64. Fixed sensors 86 and 88 are provided to ensure that the speed of the beam is taken into account and does not impact the targeting steps and methods. More specifically, as the beam moves from left to right (as shown by directional arrow 92 in FIG. 6a) to read bar code label 68, it first must pass over sensors 86 and 88 positioned in the path of the beam sweep. The laser scanner 64 first impinges upon sensor 86 and as the beam continues in the direction of directional arrow 92, it impinges upon the second sensor 88. The beam continues its trajectory and impinges upon bar code label 68, and a single scan is completed when the beam completes a 360 degree revolution (for a rotating scanner) and is back to the initial position in front of sensor 86.

Figure 7:
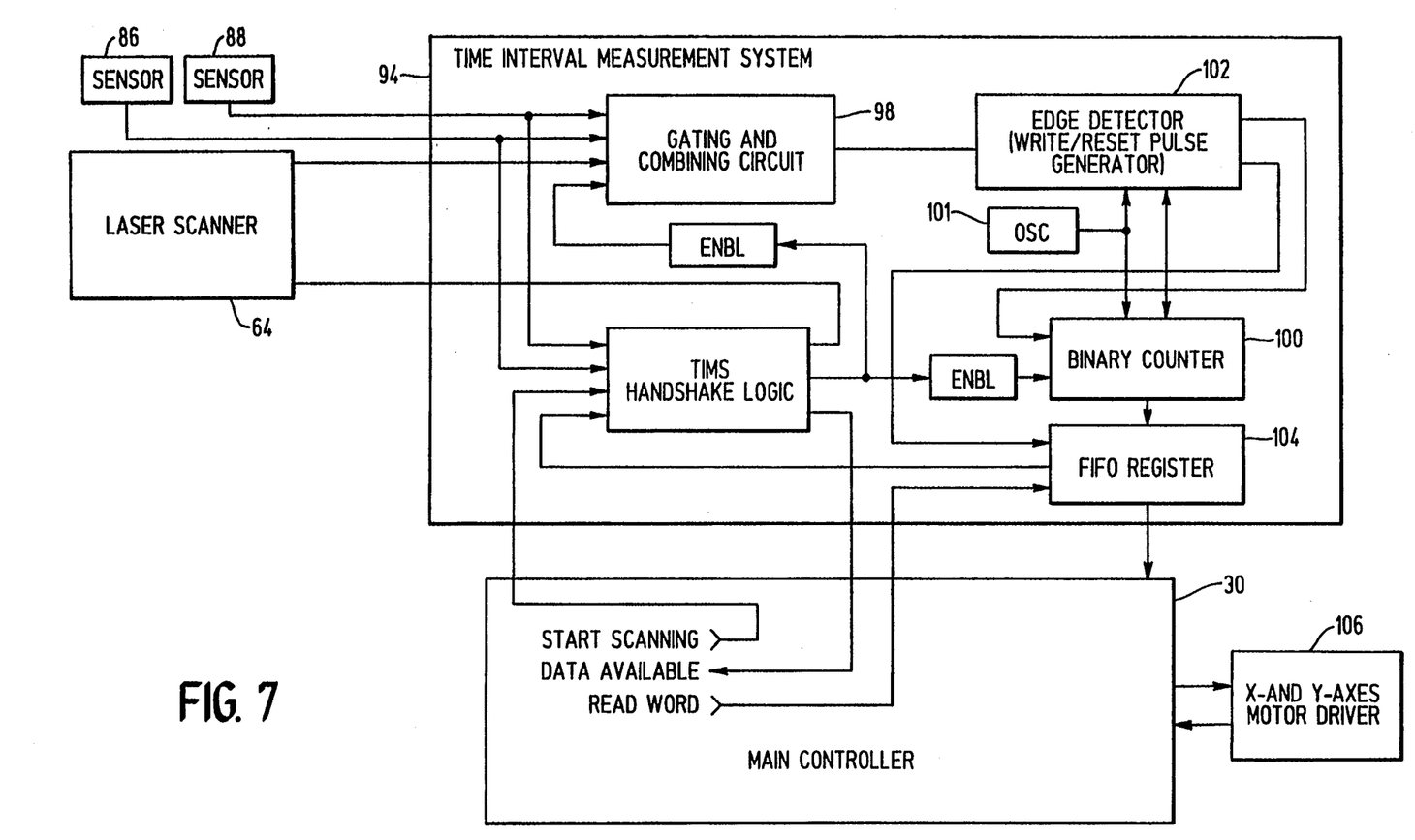
FIG. 7 is a block diagram of a time interval measurement system employed in the targeting operation of the present invention.

The scanning operation will be described in more detail with reference to FIG. 7. The main controller computer 30 sends a signal to cause a Time Interval Measurement System (TIMS) 94 to initiate a scan. A TIMS Handshake Logic 96 turns the laser scanner 64 on, and at the same time a GATING and COMBINING CIRCUIT 98 and BINARY COUNTER 100 are also enabled. Generally stated, the signals from the laser scanner 64 and sensors 86 and 88 are combined by GATING AND COMBINING CIRCUIT 94 into a single stream of data to an EDGE DETECTOR and WRITE/RESET PULSE GENERATOR 102. The EDGE DETECTOR 102 creates two separate pulses, a WRITE pulse followed by a RESET pulse. The WRITE pulse takes the binary count of a BINARY COUNTER 100 and stores it in a FIFO (FIRST-IN FIRST-OUT) REGISTER 104. The RESET pulse is used to reset the BINARY COUNTER 100 to zero in order to start the measurement of the next transition of a scan. The counter 100 counts pulses from an oscillator 101.

Figure 6B:
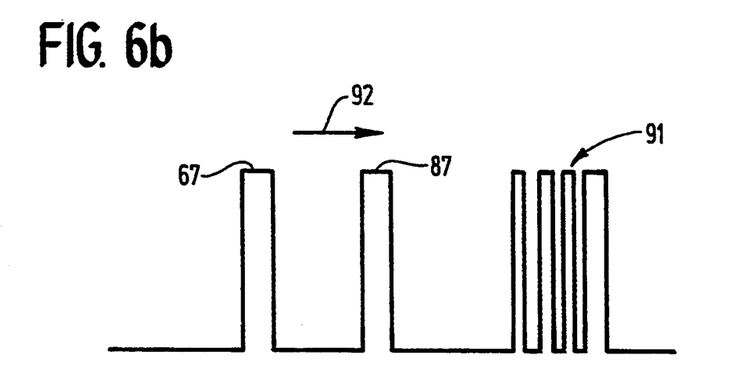

More specifically, as the targeting scan is initiated, the GATING and COMBINING CIRCUIT 98 is switched so that only sensors are detected. This switching prevents laser scanner 64 from reading external noises such as ambient light or reflections as either a sensor or bar code data. When the laser initiates and completes the pass over sensor 86, the GATING and COMBINING CIRCUIT 98 creates a pulse 87 (as best shown in FIG. 6b) as the edges of sensor 86 are detected, and EDGE DETECTOR 102 in turn converts both edges of this pulse into the two separate WRITE and RESET pulses. The WRITE pulse stores the binary count of the COUNTER 100 in the FIFO REGISTER 104, and the RESET COUNTER 100 to zero to start the measurement of the next stage of the scan. In this next scan stage, the laser continues along the path of directional arrow 92 (as shown in FIG. 6a) and impinges upon sensor 88. Again, the edges of sensor 88 are detected and a pulse 89 is generated (as best shown in FIG. 6b) by the GATING and COMBINING CIRCUIT 98. Identical to the process in connection with sensor 86, WRITE and RESET pulses are generated by the EDGE DETECTOR 102 such that the WRITE pulse takes the binary count from COUNTER 100 and stores it in the FIFO register 104 and the RESET pulse resets the COUNTER 100 to zero in order to start the next stage of the scan. As the scanner leaves sensor 88, the gating and combining circuit is switched so that the subsequent values stored in the FIFO register 104 are from the reflection receivers; i.e., the gating and combining circuit is enabled to pass signals from the scanner 64 to permit the bar code label 68 to be read. As the laser completes a full revolution and impinges upon sensor 86, the laser is turned off and the GATING and COMBINING CIRCUIT 98 and COUNTER 100 are disabled. The TIMS Handshake Logic 96 provides a signal to main controller 30 that the sequence or scan is completed, and a DATA AVAILABLE line is raised. The stored data in the FIFO register 104 is then read in the order in which it was stored by raising and lowering a READ WORD line. Reading continues until the TIMS Handshake Logic 96 determines from the FIFO Register 104 that the main controller 30 has read all the data and the DATA AVAILABLE line is then lowered. The necessary algorithms are undertaken to decode the collected data. The stored numbers represent the time between each stage of the full revolution.

For targeting purposes, the collected data is used to calculate the following: (1) the time to scan across sensor 86 (S1); (2) the time to scan between sensor 86 and sensor 88 (T1); (3) the time to scan across sensor 88 (S2); and (4) the time to scan between sensor 88 and the start of the bar codes on bar code label 68 (T2). The desired horizontal location is obtained when the ratio of (S1+TI+S2)/T2 yields a predetermined positional ratio (2.3 in the present embodiment). The horizontal (x-axis) target location is thus based upon the general default location and the location calculated through the impinging of the laser scanner 64 upon the sensors 86 and 88 and the bar code of bar code label 68. The laser scanner 64 is driven into position for the next scan by an X- and Y-axes Driver Motor 106 connected through the main controller 30. This continues until the desired ratio is achieved. When this occurs, the horizontal position of the bin may be determined.

By the use of this timed ratio technique, beam speed variations from sweep to sweep are accounted for. However, it should be understood that only one sensor would be necessary to target the horizontal location if the beam sweep speed is sufficiently constant and accurate (particular scanners may have greater speed consistency). In such an instance, distance can be determined simply by counting clock pulses between the sensor and bar code.

To accurately determine the position of a storage bin, the vertical orientation of the storage bin must also be determined. Vertical targeting is accomplished through the reading of the bar code on bar code label 68 by laser scanner 64. For each beam sweep, not only is a ratio value derived from which the horizontal positioning is determined, but the vertical position (y-axis position) is also determined. As is seen in FIG.4, bar code label 68 actually includes two bar codes, an upper bar code 108 and a lower bar code 110. Upper and lower bar codes 108 and 110 are readable as two different values and during targeting the laser scanner 64 actually may read either the upper bar code 108, the lower bar code 110 or the area where the two bar codes meet. When the laser scanner 64 reads the upper bar code 108, then the robot targeting system is targeted above center. Similarly, if the laser scanner 64 reads the lower bar code 110, then the robot is targeted below center. As the beam sweeps, the laser scanner 64 is stepped vertically (up or down) by a small increment through X- and Y- axes Drive Motor 106 until the proper and accurate vertical positioning is established. That is, the scanning is repeated as the reader assembly 54 is stepped vertically along the y-axis in small increments to obtain the desired bar code reading from laser scanner 64. This vertical position is at the point where upper and lower bar codes 108 and 110 meet and the use of laser scanner 64 affords precise determination of the corresponding y-axis location. By way of example, in the preferred embodiment laser scanner 64 may utilize a rotating mirror that enables scanning to be performed at a rate of 200 times per second and a positioning resolution of 1/3000" to be obtained. It should be appreciated that when laser scanner 64 reads this middle position, the result may be the reading of a transition between the two bar codes 108 and 110, or, alternatively, the reading of an invalid bar code. This transition value (or invalid value) is the basis of the vertical (y-axis) location of the storage bin being targeted.

During routine cassette retrieval, after laser scanner 64 reads the specific cassette bar code label, the gripper mechanism 50 must be moved into proper position to enable gripper 62 to grasp the cassette. As best shown in FIG. 5, gripper mechanism 50 is located in a fixed position relative to the manipulator assembly 40 and therefore, like the bar code offset, a pick up offset may be calculated as a fixed, pre-set value. Gripper mechanism 50 includes a gripper backstop 61 which ensures that the cassette being moved is securely and consistently grasped. The pickup point offset indicates the relative x- and y-axes location (with respect to the target position) where manipulator assembly 40 must be positioned to allow the gripper mechanism 50 to retrieve a cassette from the desired storage bin. Once the precise location of a storage bin is determined by scanning the bar code label 68 of targeting cassette 66, it is then possible to precisely position manipulator assembly 40 into position for cassette retrieval. The precise position for cassette retrieval may be expressed in terms of the targeted x- and y-axes location of a specific storage bin in which the desired cassette is placed, and the x- and y-axes location of the pre-set pick up point offset.

Figure 8:
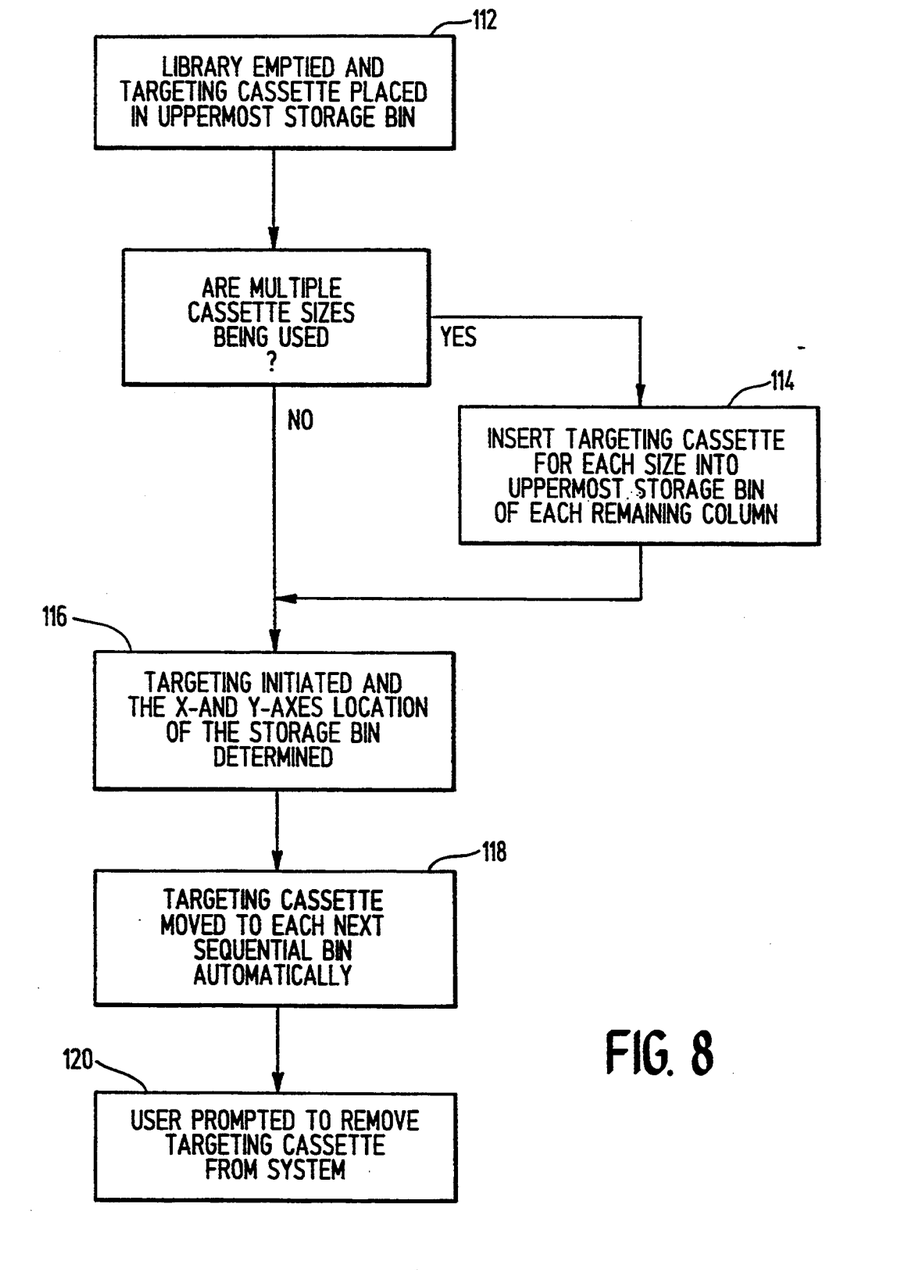
FIG. 8 is a block diagram of the sequence of the automatic targeting system of the present invention.
Figure 9:
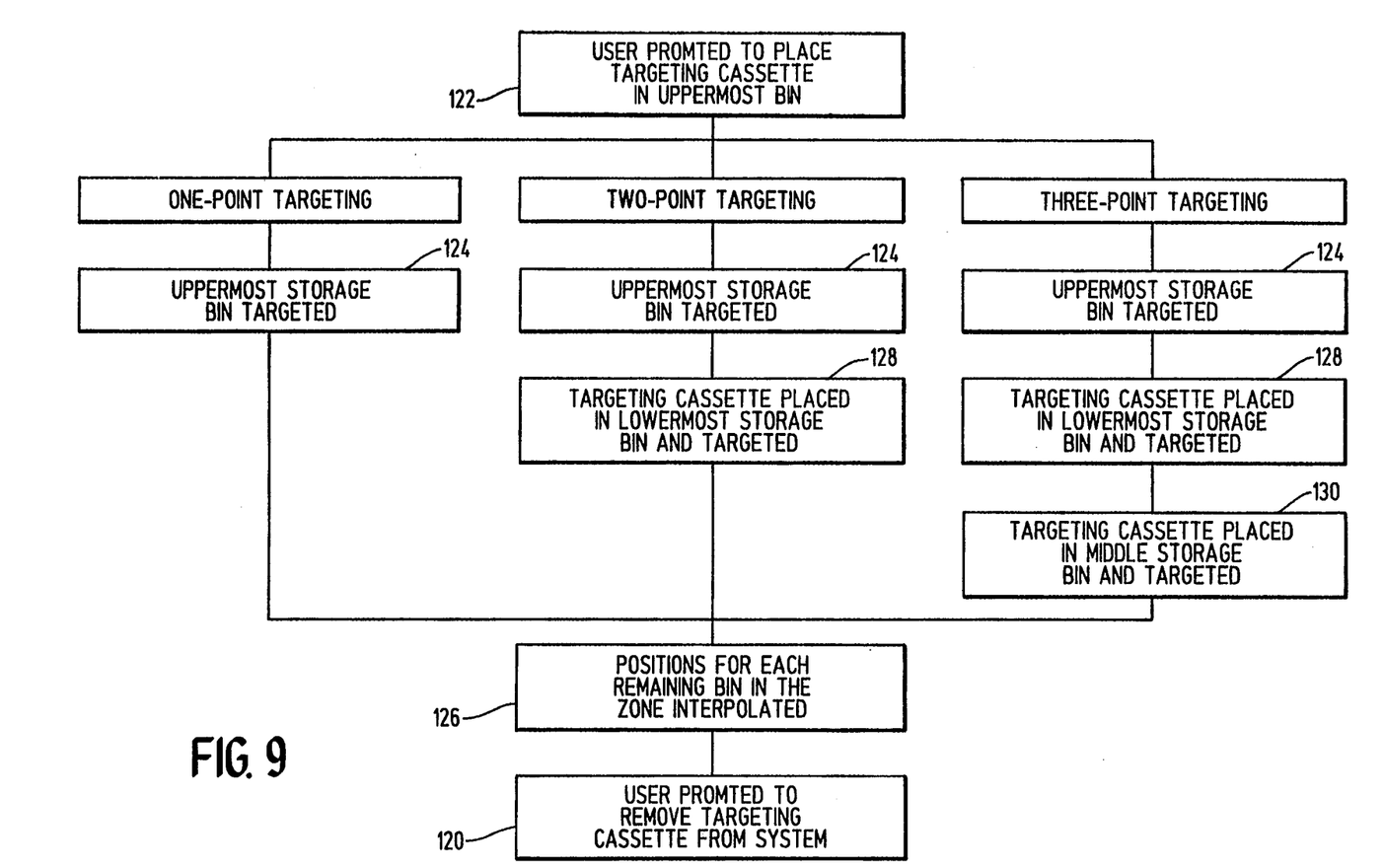
FIG. 9 is a block diagram of the sequence of the zone targeting system of the present invention.

The actual targeting process of the library bin portion 14 and transports 22 will be discussed in connection with FIGS. 8 and 9. In the automatic system mode as shown in FIG. 8, each and every storage bin, load port bin and transport is individually targeted. The user is prompted by the computer display (step 112) to empty the entire library contents, and to place a targeting cassette in the left uppermost bin. If the system is configured with multiple cassette sizes as shown in FIG. 2, the user is prompted (step 114) to place the appropriate sized targeting cassette in the uppermost bin of each correspondingly sized column. The user acknowledges that the placement of targeting cassettes has been completed and targeting is commenced. That is, the manipulator assembly 40 moves into the pre-stored default x- and y-axes location of the first cassette storage bin where the targeting cassette 66 has been placed. Scanning is then initiated as the laser scanner 64 impinges upon sensors 86 and 88 and then bar code label 68. From the resulting pulses and reading, a determination (step 116) is made as to the precise location of the storage bin and this location is stored in the system. The gripper 62 of gripper mechanism 56 then grasps targeting cassette 66 and moves it down to the next immediately sequential storage bin (step 118). The scanning is again initiated and the pulses and reading from this scan are utilized to determine the exact x- and y-axes location of the bin. This process is sequentially repeated for all storage bins. Finally, after all targeting has been completed, the user is prompted to remove the targeting cassette(s) 66 (step 120) and the system, upon the user's compliance, returns to a main menu for routine cassette handling and sequencing.

It should be appreciated that the automatic system targeting mode of FIG. 8 requires that all of the storage bins be empty. Removal of all cassettes from the library portion 14, however, may be very inconvenient except for during installation or system overhaul. Accordingly, a targeting method called "zone" targeting is also contemplated by the present invention and permits targeting to be performed when the library contains cassettes. FIG. 9 depicts the methodology for targeting the system by specific zone. Zone targeting may be accomplished through three different point algorithms: one-point targeting, two-point targeting and three-point targeting. Each of the algorithms, which are quite similar, is discussed below. In the one-point targeting system, the user is prompted (step 122) to place targeting cassette 66 in the uppermost storage bin of the specified zone and acknowledge the system to continue. The system then targets (step 124) the single storage bin location (the uppermost bin in the zone) and the x- and y-axes positions for the remaining bins in the zone are interpolated (step 126). That is, the relative y-axis value of the targeted storage bin is used for the remaining bins in the zone. The x-axis values are interpolated and are based upon the nominal vertical clearance for each storage bin/port in the zone. Upon completion of the targeting the user is prompted to remove the targeting cassette 66 (step 120).

In the two-point targeting, the uppermost and lowermost storage bins in the zone are targeted and all the storage bins therebetween are interpolated. More specifically, the user is prompted (step 122) to place targeting cassette 66 in the uppermost bin and the system targets the uppermost storage bin (step 124). After the uppermost storage bin targeting is completed, the user is prompted to place targeting cassette 66 in the lowermost storage bin and the system targets the same (step 128). Based upon the uppermost and lowermost targeting, the system then performs an interpolation (step 126) assuming a linear deviation for all bins and establishes precise x- and y-axes locations for each storage bin in the zone. The user is then prompted to remove the targeting cassette 66 (step 120).

In the three-point targeting system, the uppermost, middle and lowermost storage bins in the zone are targeted. The system specifies the three points to be targeted and then interpolates the target positions of the remaining storage bins in the zone. Again, the system assumes a linear deviation for all bins. In the three-point zone targeting operation, the user is prompted to move targeting cassette 66 to each of the three storage bins to be targeted (steps 124, 128, and 130). After targeting cassette 66 is targeted within each of the designated storage bins, the relative x- and y-axes position for each remaining storage bin in the zone is calculated by interpolation (step 126) and the user is prompted to remove the targeting cassette 66 (step 120).

It should be appreciated that in the automatic mode system of targeting (FIG. 3), the system does not conduct any interpolation. Rather, the system automatically targets every bin in the zone proceeding from the uppermost to the lowermost bin. As discussed above, it is contemplated that a system embodying the present invention may utilize more than one cassette size and the automatic mode requires the user to initially place one targeting cassette of each respective size depending upon the scope of the target operation.

It is possible to target a single bin through individual targeting. If such targeting is desired, the user is prompted for the location at issue and then prompted to place targeting cassette 66 in the requested bin. Manipulator assembly 40 is moved to the default target location and laser scanner 64 scans the bar code label 68 on targeting cassette 66. The user is prompted to remove targeting cassette 66 and the precise x- and y-axes locations of the storage bin are determined.

During the targeting process, it is also possible for the user to create a user offset in the system for the purpose of fine tuning the stored storage bin x- and y-axes location. In certain circumstances, the user may notice that a drive belt has slipped, or that one or more storage bins appear to be out of alignment. Accordingly, the present invention contemplates that the user may also change the targeting position by creating a user offset through three alternative ways: 1) entering an absolute or global x,y axis offset; 2) targeting a single bin; or 3) targeting a single bin with fine tune. First, the user offset may be designated as a global offset. That is, a relative x- and y-axes position is selected to be applied to all cassette retrieval and bar code reading operations, and which can not be selectively turned on or off by bin type, bin zone or bin location. It is thus possible for the user to enter, by hand, an absolute offset value into the system. Such an offset might be utilized when, for example, the user notices that a drive belt has slipped, but it is preferable to not have to re-target the entire system.

The user may also re-target a specific storage bin, as described above. For this user offset, the current alignment of a storage bin is determined by the user, and the difference between the existing target location and the user-determined new target position may be considered to be a calculated user offset which allows an accurate pickup position. The target position is not altered, but rather a new user offset established by the system.

Finally, the user may fine-tune target a single bin by visual inspection, manually altering the x- and y-axes offset coordinates to the desired position. The present invention, then, keeps track of: 1) the target position of each storage bin; and 2) a nominal offset, in terms of pick-up point and a bar code offset; and 3) any user offset. It is also contemplated that in determining the precise location of a storage bin, bar code labels may be affixed to each respective storage bin instead of using a targeting cassette. In such an arrangement, it is not necessary to move a targeting cassette to a storage bin for targeting. The precise location of the storage bins is targeted based upon the default target locations and the x- and y-axes locations determined from scanning the bar code labels affixed on the storage bins.

Figure 10:
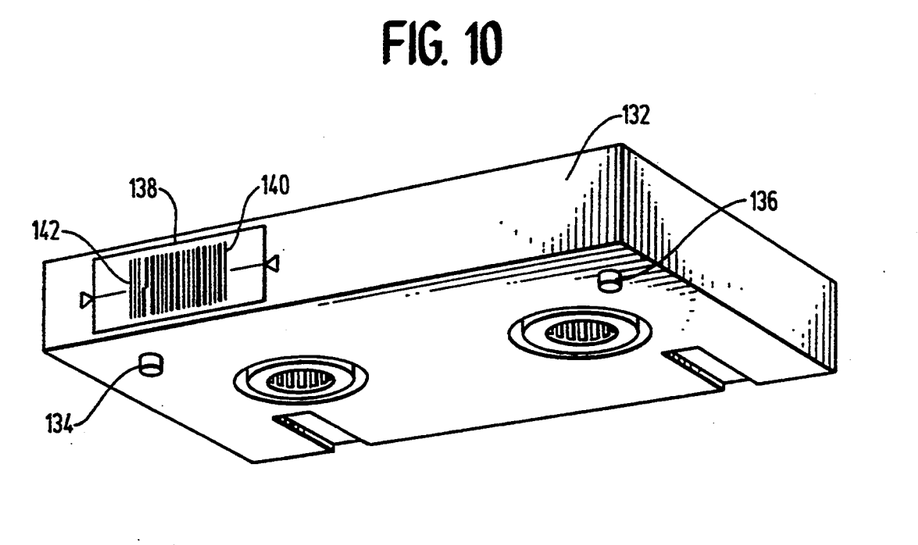
FIG. 10 is a perspective view of a transport plug targeting cassette of the present invention.

Targeting of a transport is accomplished through the use of a plug targeting cassette 132, as shown in FIG. 10. In the exemplary embodiment of FIG. 10, plug targeting cassette 132 does not have an automatic centering capability as is found in targeting cassette 66. This is because the plug targeting cassette 132 is not actually placed within a transport 22. Two vertical dowels 134 and 136 are used to prevent the plug targeting cassette 132 from actually entering a transport 22 in order to avoid damaging any of the playing or rewinding heads or functions. Similar to targeting cassette 66, plug targeting cassette 132 includes a bar code label 138 having upper and lower bar codes 140 and 142 which are utilized for targeting.

Targeting of the transports 22 is completed by the same method as previously described. The plug targeting cassette 132 is placed into the transport 22 desired to be targeted and the bar code label 138 is scanned by laser scanner 64. The transport 22 x- and y-axes location is then calculated in the same manner as described in connection with targeting cassette 66.

The best presently contemplated mode of carrying out the present invention has been described. A targeting system is provided in which the precise location of each storage bin in a robotics handling system is determined based upon the scanning of a targeting cassette placed within the storage bin. A bar code label on the targeting cassette is scanned and this scanning provides the basis for determining the precise center of the storage bin. While in the preferred embodiment the position of the targeting cassette is based upon the scanning and certain predetermined offsets, it should nevertheless be understood that various modifications may be made without departing from the spirit and scope of the invention which is limited only by the scope of the appended claims.

I claim:

1. A laser targeting system for use with a robotics materials handling system for storing and handling cassettes, comprising:
    library means for storing cassettes, said library means having a plurality of stationary storage bins, each bin for holding one of said cassettes;
    a targeting cassette having an identification code thereon;
    manipulator means for handling said targeting cassette and selectively moving said targeting cassette between said storage bins;
    scanning means for reading said identification code; and
    control means for calculating the precise location of said targeting cassette within a storage bin and using said calculated precise location to position said manipulator means for subsequent retrieval of said cassettes.

2. A laser targeting system as defined in claim 1, wherein said scanning means includes first and second sensors and a laser scanner that sweeps a laser beam sequentially across the first sensor, second sensor and said identification code.

3. A laser targeting system as defined in claim 1, wherein said system further comprises centering means for positioning said targeting cassette into each of said bins.

4. A laser targeting system as defined in claim 1, wherein said control means utilizes an interpolation calculation to determine the relative position of each storage bin after an initial bin position is located.

5. A laser targeting system as defined in claim 2, wherein said identification code is comprised of two vertically stacked readable bar codes.

6. A laser targeting system as defined in claim 1, wherein said manipulator means includes a gripping mechanism for retrieving said cassettes from said storage bins.

7. A laser targeting system for use with a robotics materials handling system for storing and handling cassettes, comprising:
    library means for storing cassettes, said library means having a plurality of stationary storage bins, each bin for holding one of said cassettes;
    targeting cassette insertable within said storage bins and having an identification code comprising two vertically stacked readable bar codes;
    manipulator means including a gripping mechanism for handling said targeting cassette and selectively moving said targeting cassette between said storage bins;
    scanning means including a laser scanner for reading said vertically stacked bar codes; and
    control means for calculating the precise location of said targeting cassette within a storage bin.

8. A laser targeting system as defined in claim 7, wherein said control means determines the horizontal and vertical position of said identification code based upon readings from said laser scanner.

9. A laser targeting system as defined in claim 8, wherein said horizontal position is determined by calculating a ratio of the angular scan distance between first and second sensors and the angular scan distance from the second sensor to the bar codes.

10. A method for determining storage bin position of a robotics material system having a plurality of storage bins comprising the steps of:
    providing a targeting cassette having an identification code at a predetermined location thereon and inserting said targeting cassette within one of said storage bins;
    scanning said identification code to determine the precise location thereof within the storage bin; and
    calculating the position of said storage bin based upon said scanning.

11. The method for targeting a robotics material system as defined in claim 10, reading said identification code through the use of a laser scanner.

12. The method for targeting a robotics material system as defined in claim 10, comprising the further step of moving said targeting cassette to one or more additional storage bins and calculating the position of the targeting cassette in said one or more additional storage bins.

13. The method for targeting a robotics material system as defined in claim 10, wherein step of calculating further includes the calculation of a relative x- and y-axes location of said targeting cassette.

14. The method for targeting a robotics material system as defined in claim 10, wherein said method for targeting comprises the further step of moving said targeting cassette to a second storage bin, reading said identification code and calculating the position of said targeting cassette based upon said reading.

15. The method for targeting a robotics material system as defined in claim 10, wherein said method for targeting comprises the further step of calculating the location of at least one storage bin through interpolation of calculated positions of other storage bins.

16. A laser targeting system for use with a robotics materials handling system for storing and handling cassettes, comprising:
    a plurality of storage bins for storing said cassettes, each of said storage bins having a predetermined default location indicative of its nominal position;
    scanning means for detecting identification codes located on cassettes; and
    control means for determining the precise position of said storage bins based upon said predetermined default location and the operation of the scanning means.

17. A targeting system as in claim 16 including a targeting cassette having a bar code located thereon, wherein the scanning means reads the bar code when the cassette is in a storage bin and wherein the control means determines position based upon the read code.

18. A targeting system as in claim 17 wherein the bar code is comprised of upper and lower adjacent bar code portions and the control means operates to detect the border between the adjacent bar codes.

19. A laser targeting system for use with a robotics materials handling system for storing and handling articles, comprising:
library means for storing articles, said library means having a plurality of stationary storage areas, each storage area for holding one of said articles;
a targeting article having an identification code thereon;
manipulator means for handling said targeting article and selectively moving said targeting article between said storage areas;
scanning means for reading said identification code; and
control means for calculating the precise location of said targeting article within a storage area based upon said scanning and using said calculated precise location to position said manipulator means for subsequent retrieval of said articles.

20. A method for determining storage area location in a robotics material system having a plurality of storage areas, comprising the steps of:
inserting a targeting article having an identification code into one of said storage areas;
reading said identification code to identify a particular point thereon and determining position coordinates of said point; and
calculating the position of said storage area based upon said reading.

21. A method for determining storage area location in a robotics material system having a plurality of storage areas, comprising the steps of:
inserting a targeting article having a reference mark into one of said storage areas;
scanning said targeting article to determine the location of said reference mark; and
determining at least one position coordinate of the storage area based on said scanning.

* * * * *